United States Patent [19]

Eumann

[11] Patent Number: 4,699,714
[45] Date of Patent: Oct. 13, 1987

[54] ION EXCHANGE APPARATUS

[76] Inventor: Hanns-Heinz Eumann, Lerchenweg 1, D-7034 Gärtringen, Fed. Rep. of Germany

[21] Appl. No.: 893,590

[22] Filed: Aug. 6, 1986

[30] Foreign Application Priority Data

Aug. 10, 1985 [DE] Fed. Rep. of Germany ....... 3528800

[51] Int. Cl.$^4$ .............................................. B01J 49/00
[52] U.S. Cl. .................................... 210/140; 210/279; 210/289; 210/290
[58] Field of Search ............... 210/140, 143, 269, 275, 210/277, 279, 289, 291, 293, 290

[56] References Cited

U.S. PATENT DOCUMENTS

| 2,891,007 | 6/1959 | Caskey et al. | 210/279 |
| 3,498,462 | 3/1970 | Larrowe et al. | 210/293 |
| 4,220,531 | 9/1980 | Robison | 210/289 |
| 4,237,538 | 12/1980 | Le Dall | 210/143 |

Primary Examiner—Ivars Cintins
Attorney, Agent, or Firm—Becker & Becker, Inc.

[57] ABSTRACT

An ion exchange apparatus in which granular exchanger material is deposited to a level above a horizontal drainage for the regeneration medium solution of an ascending countercurrent regeneration process and considerably below an upper liquid connection. A timing generator that divides the regeneration phase into flow segments and rest segments is provided. To reduce the amount of regeneration medium required while changing only slightly the flow resistance and improving the exchanger efficiency, the concentration of the regeneration medium solution is increased to a value that without the timing generator leads to poor utilization of a given amount of regeneration medium. An additional layer of exchanger material excluded from the regeneration process is deposited to a level considerably above the drainage. An intermediate layer of exchanger material extends to a level considerably below the drainage, adjoins the additional layer, and can be mixed with the latter via a mixing device. As constituents of the mixing device, backwash nozzles are provided at the lower boundary of the intermediate layer. These backwash nozzles are distributed over a plurality of nozzle heads that are supplied via the drainage and spacers that extend downwardly from the drainage.

8 Claims, 2 Drawing Figures

ION EXCHANGE APPARATUS

BACKGROUND OF THE INVENTION

1. Field of the Invention

The present invention relates to an ion exchange apparatus in which, in an erect elongated tank, granular exchanger material is deposited on a nozzle plate, which is disposed above a lower liquid connection, until a level is reached that is above a horizontal drainage for the regeneration medium solution of an ascending countercurrent regeneration process, with this level being considerably below an upper liquid connection. A feed line for the regeneration medium solution leads to the tank, and disposed on a pump or valve in this feed line is an automatic switching mechanism for the alternative feeding or nonfeeding of the regeneration medium solution. The automatic switching mechanism is provided with a timing generator for dividing the regeneration phase into flow segments and rest segments.

2. Description of the Prior Art

An ion exchange apparatus of this general type where the automatic switching mechanism is not provided with a timing generator that divides the regeneration phase into flow segments and rest segments is known from German Offenlegungscchrift No. 25 55 131. In order to reduce the requirement for regeneration medium, to stabilize the flow resistance, and to improve the exchanger efficiency, with this heretofore known ion exchange apparatus a small portion of the exchanger material is confined in a pressed state between the nozzle plate and a nozzle partition disposed thereabove, with the volume ratio of confined portion to nonconfined exchanger material preferably being 1:3.5. The nozzle partition assures that the regeneration medium solution is not made use of at all in a lower safety zone of unloaded exchanger material, subsequently has a high regeneration effect on partially loaded exchanger material, and finally still has a good utilization on highly depleted exchanger material in the uppermost exchanger material zone with close-fitting dimensions. In the absence of the aforementioned pressing, unloaded exchanger material granules that are whirled upwardly during regeneration would impair the utilization of the regeneration medium solution, and downwardly whirled depleted exchanger material granules would impair the safety zone. However, as previously, a whirling or fluidization of the exchanger material disposed above the nozzle partition takes place. Increasing the concentration of the regeneration medium solution cannot be undertaken because the flow velocity during regeneration cannot drop below a certain threshold value. In the automatic switching mechanism of the ion exchange apparatus, especially the transition from the loading phase to the regeneration phase is fixed. Serving as a signal transmitter is a measuring probe that extends into the tank just above the nozzle partition. This measuring probe registers the increase of the electrical conductivity of the liquid that is being treated as the adjoining exchanger material begins to become depleted.

German Auslegeschrift No. 14 42 389 discloses an ion exchange apparatus of the aforementioned general type. This known apparatus is based on having the regeneration liquid uniformly pass through the exchanger resin without forming passages, and with the process being undertaken without excess regeneration fluid. After the regeneration has been terminated, the liquid in the resin bed is displaced by being pulsatingly subjected to a new quantity of regeneration fluid. Subsequently, the displacing fluid is withdrawn below the free resin surface, and the resin bed is flushed in a conventional manner. To produce the regeneration liquid, 2.7% hydrochloric acid, which originates from a previous regeneration process, is replenished to a concentration of 5%.

From "Ullmanns Encyklopädie der technischen Chemie", volume 8, 1957, page 830, it is known that during the regeneration of a loaded ion exchanger, in addition to the type of regeneration medium, the specific quantity and concentration thereof play a role in the process.

An object of the present invention is to provide an ion exchange apparatus that is regenerated in an ascending countercurrent, whereby the requirement for regeneration medium is reduced, the flow resistance is altered only slightly, and the exchanger efficiency is improved.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
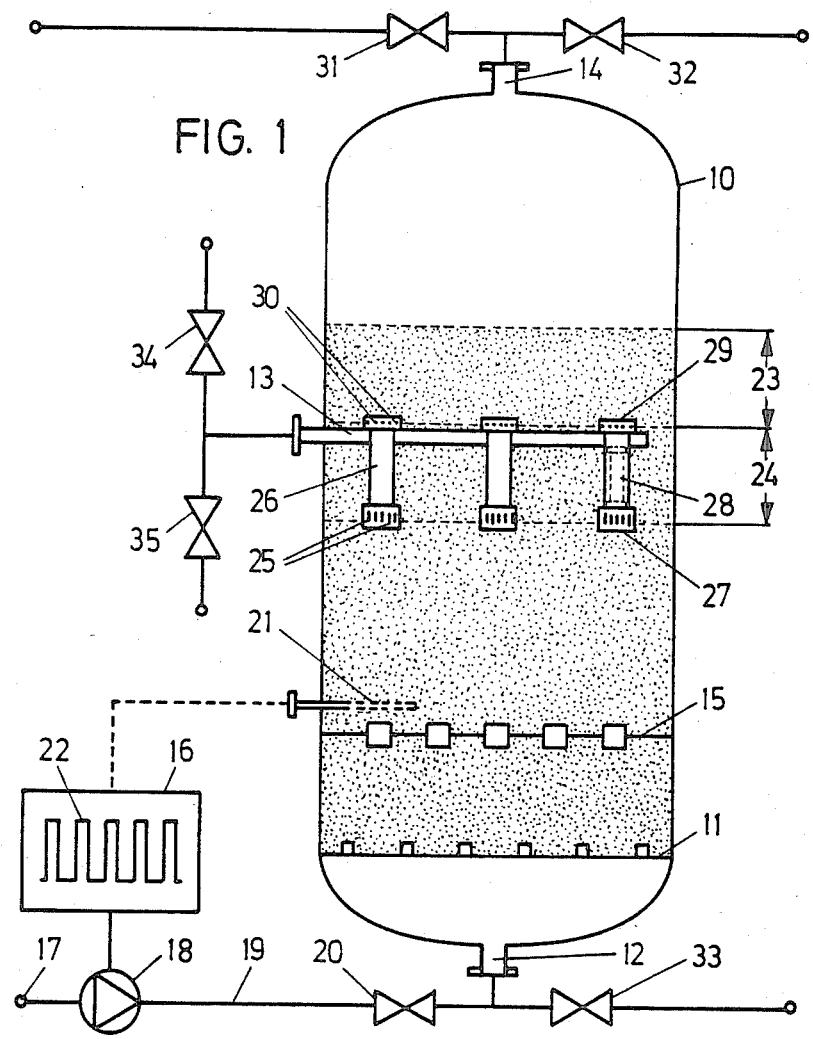
FIG. 1 is an overall view of a preferred embodiment of the inventive ion exchange apparatus, and shows a vertical cross-sectional view of the tank thereof.
Figure 2:
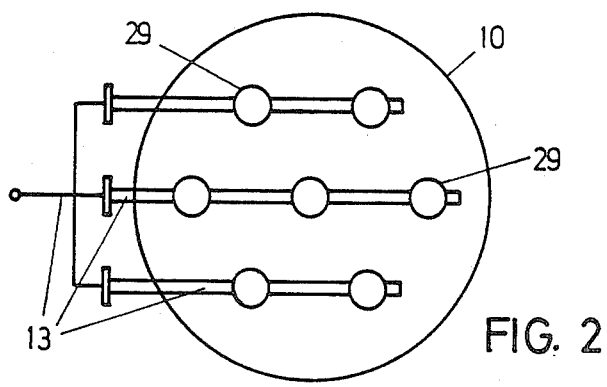
FIG. 2 is a plan view of the horizontal drainage in the tank of the ion exchange apparatus of FIG. 1.

The ion exchange apparatus of the present invention is characterized primarily in that the concentration of the regeneration medium solution is increased to a value that without the timing generator leads to a poor utilization of a given quantity of regeneration medium, and in that the granular exchanger material is divided into three layers, namely a bottom layer deposited on the nozzle plate and extending to a level considerably below the drainage, an intermediate layer deposited on top of the bottom layer, and an additional layer deposited on top of the intermediate layer and extending to a level considerably above the drainage, with the exchanger material of the additional layer being excluded from the regeneration process, and with the exchanger material of the additional layer being mixable with the exchanger material of the intermediate layer via a mixing device.

With the inventive apparatus, in an efficient manner, extremely depleted exchanger material is recovered and is transferred into the last length of tracing or travel of the regeneration medium solution prior to the drainage, so that the last of the regeneration power is drawn from the already considerably used regeneration medium solution. On the whole, the amount of regeneration medium required is reduced by about fifteen to twenty per cent. Approximately two thirds of this improvement can be attributed to the increase in concentration in conjunction with the timing generator. Furthermore, the additional layer produces the advantage of an improved liquid distribution, especially since the exchanger material thereof, which is excluded from the regeneration process, contains a correspondingly greater weight and thus exerts an increased pressure upon the exchanger material disposed therebelow.

The reduction in the amount of regeneration medium that is required is based in part on the fact that, on the one hand, the end concentration of the regeneration medium solution is fixed until the regeneration reaction dominates, and the starting concentration of the regeneration medium solution is considerably increased, and, on the other hand, the timing generator prevents the quantity of regeneration medium solution, which is reduced to a higher concentration, from passing through too rapidly in less than the reaction time of the granular exchanger material. Furthermore, the timing generator limits the whirling or fluidization of the exchanger material during regeneration, with the effect of further reducing the requirement for regeneration medium. This is accomplished without deteriorating in the end result the pushing back of the dirt particles to the uppermost level of the exchanger material. Due to the more careful treatment of the granular exchanger material, less wear results, which, among other things, is advantageous for keeping the size and cost of the flow resistance of the ion exchange apparatus to a minimum. The timing generator also leads to improved separation of the exchanger material, which further reduces the flow resistance, and to better elimination of the formation of preferred flow lines, which further increases the exchanger efficiency.

Further specific features of the present invention will be described in detail subsequently.

DESCRIPTION OF PREFERRED EMBODIMENTS

Referring now to the drawing in detail, in the erect elongated tank 10 of the ion exchange apparatus, granular exchanger material is deposited on the nozzle plate 11, which is disposed above the lower liquid connection 12, until a level is reached that is above the horizontal drainage 13, and is considerably below the upper liquid connection 14. The nozzle partition 15 that is incorporated in the drawing, and the advantages of which were discussed previously, should cause no problem. The partition 15 can be provided, but it is not absolutely necessary to do so.

The automatic switching mechanism 16 for the alternative supply or nonsupply of the regeneration medium solution 17 is mounted on the pump 18 in the feed line 19 for the regeneration medium solution 17. The automatic switching mechanism 16 is primarily provided for the change cycle of loading phase and regenerating phase of the ion exchange apparatus. Serving as a signal transmitter is a measuring probe 21 that projects into the tank 10 just above the nozzle partition 15. The measuring probe 21 registers the increase of the electrical conductivity of the liquid that is being treated at the beginning of the depletion of the adjacent exchanger material.

The automatic switching mechanism 16 receives an additional function due to the timing generator 22 that is installed therein and divides the regeneration phase into flow segments and rest segments. Whereas the regeneration phase covers approximately thirty to forty-five minutes, the individual flow segments last about five to thirty seconds, and the individual rest segments last approximately ten to fifty seconds. In conjunction herewith, the concentration of the regeneration medium solution is increased, for example from approximately five to seven percent, where HCl is the regeneration medium, to approximately eight to twelve percent, and from approximately three to five percent, where NaOH is the regeneration medium, to approximately five to seven percent.

At least in the beginning, the exchanger material of the additional layer 23, which is deposited to a level considerably above the drainage 13, and which is excluded from the regeneration, does not differ from the remaining exchanger material of the ion exchanger apparatus. The same is true for the exchanger material of the intermediate layer 24 that adjoins the additional layer 23 and which can be mixed with the latter via an appropriate mixing device. The nearly uniform grain diameters of the exchanger material have a value in the range of from 0.4 to 1.2 mm. The additional layer 23 and the intermediate layer 24 have approximately the same amount of exchanger material in order to increase the yield or efficiency of the regeneration medium solution, and to provide the mixing device with sufficient clearance. To keep the place required for it in the tank 10 to a minimum, the additional layer 23 contains less than one fourth of the total amount of exchanger material. In each case, however, the additional layer 23 has a height of greater than 10 cm so that it can reliably fulfill its expectations.

As constituents of the mixing device, backwash nozzles 25 are disposed at the lower boundary of the intermediate layer 24. In this manner, the mixing device is embodied in a particularly simple and operationally reliable manner, the backwashing is limited to the upper exchanger material, and the mixing is combined with the backwashing. Since the backwash nozzles 25 are distributed on a plurality of nozzle heads 27 that are supplied via the drainage 13 and spacers 26 that extend downwardly from the drainage 13, the latter receives a double function, it is unnecessary to have a supplementary liquid connection on the tank 10, and the disruptive foreign-body-influence of the mixing device in the exchanger material is kept to a minimum.

In order in this connection to preclude impairment of the regeneration operation and of the backwash operation, each spacer 26 contains a change-over valve 28 that closes off an upper nozzle head 29 of the drainage when the lower nozzle head 27 of the mixing device opens, and which closes off the nozzle head 27 of the mixing device when the nozzle head 29 of the drainage opens. To adapt to the different flow velocities, the change-over valve 28 has a relatively small flow passage for the nozzle head 29 on the drainage, and a relatively large flow passage for the nozzle head 27 of the mixing device.

The drainage 13 comprises a plurality of parallel pipes that are united outside the tank 10. The drainage nozzles 29 that are otherwise customary for such a drainage 13 have been transferred from the pipes into the nozzle heads 30 that are supported by the pipes. Just like the nozzles of the plate 11 and the nozzles of the partition 15, the radially inwardly directed drainage nozzles 30 of the nozzle heads 29, which are distributed over the cross-sectional area of the tank 10, and the radially outwardly directed backwash nozzles 25 of the similarly distributed nozzle heads 27, are embodied in such a way that the granular exchanger material cannot enter them.

Provided ahead of the upper liquid connection 14 of the tank 10 are an inlet valve 31 for the liquid that is to be treated in the loading phase of the ion exchange apparatus, and an outlet valve 32 for the backwash liquid that is used to mix the additional layer 23 and the intermediate layer 24. Provided ahead of the lower liquid connection 12 of the tank 10, are an inlet valve 20 for the regeneration medium solution and an outlet valve 33 for the liquid that is treated in the loading phase of the ion exchange apparatus. And disposed ahead of the drainage 13 are an inlet valve 34 for the backwash liquid and an outlet valve 35 for the used regeneration medium solution. In each of these three pairs of valves, a given one of the valves can be opened only when the other valve of that pair is closed and, in addition, the nonpartners in the other two valve pairs are closed.

The present invention is, of course, in no way restricted to the specific disclosure of the specification and drawings, but also encompasses any modifications within the scope of the appended claims.

What is claim is:

1. An ion exchange apparatus in which, in an erect elongated tank, granular exchanger material is deposited on a nozzle plate, which is disposed above a lower liquid connection, until a level is reached that is above a horizontal drainage means for the regeneration medium solution of an ascending countercurrent regeneration process, with this level being below an upper liquid connection; a feed line for the regeneration medium solution leads to said lower liquid connection of said tank, and communicating with this feed line is an automatic switching mechanism for the alternative feeding or nonfeeding of said regeneration medium solution, with said automatic switching mechanism being provided with a timing generator for dividing the regeneration phase into flow segments and rest segments; the improvement wherein:

the concentration of said regeneration medium solution has a value of a magnitude that without said timing generator leads to a poor utilization of a given quantity of regeneration medium; and said granular exchanger material in said tank comprises three layers, including a bottom layer that is deposited on said nozzle plate and extends to a level below said drainage means, an intermediate layer that is deposited on top of said bottom layer, and an additional layer that is deposited on top of said intermediate layer and extends to a level above said drainage means, with the exchanger material of said additional layer being excluded from the regeneration process, and with the exchanger material of said intermediate layer being mixable with the exchanger material of said additional layer by means of a mixing device that is disposed in said tank.

2. An apparatus according to claim 1, in which said additional layer and said intermediate layer contain approximately the same amount of exchanger material.

3. An apparatus according to claim 2, in which said additional layer contains less than one fourth of the entire amount of exchanger material that is deposited in said tank.

4. An apparatus according to claim 3, in which said additional layer has a height of greater than 10 cm.

5. An apparatus according to claim 3, in which said mixing device includes backwash nozzles disposed at the interface between said bottom layer and said intermediate layer.

6. An apparatus according to claim 5, which includes spacers that extend downwardly from said drainage means in the direction toward said nozzle plate; and in which said backwash nozzles are distributed on a plurality of first nozzle heads that are supplied by said drainage means and said spacers.

7. An apparatus according to claim 6, in which said drainage means includes upper nozzle heads, with each of said spacers being provided with a change-over valve to close said upper nozzle heads when said first nozzle heads of said mixing device are open, and to close said first nozzle heads when said upper nozzle heads are open.

8. An apparatus according to claim 7, in which said change-over valves each have a relatively small flow opening for said upper nozzle heads of said drainage means, and a relatively large flow opening for said first nozzle heads of said mixing device.

* * * * *